PULSE COUNTING CIRCUIT WITH SELF CHECKING FACILITIES

Filed Jan. 17, 1967

INVENTORS A. H. BUDLONG
F. F. TAYLOR
BY Frederick W. Padden
ATTORNEY

United States Patent Office 3,492,540

Patented Jan. 27, 1970

3,492,540
PULSE COUNTING CIRCUIT WITH SELF CHECKING FACILITIES

Albert H. Budlong, Wheaton, and Frank F. Taylor, West Chicago, Ill., assignors to Bell Telephone Laboratories, Incorporated, Berkeley Heights, N.J., a corporation of New York Filed Jan. 17, 1967, Ser. No. 609,858
Int. Cl. H01h *47/14;* H04q
U.S. Cl. 317—140 12 Claims

ABSTRACT OF THE DISCLOSURE

A five relay decimal pulse counter circuit wherein each of the relays is connected by reiterative contact array to an operating and holding path. During the counting sequence, a discrete combination of three relays out of the five relays is operated in response to each received pulse and two of these relays subsequently remain operated during a succeeding interpulse interval. This operational sequence is the basis for inherent self-checking by contact networks of the counter relays which are actuated to verify the operational accuracy of the counter circuit.

This invention relates to unifunctional circuits and particularly to a pulse counting circuit having a plurality of counter switching elements operated in a uniquely patterned sequence during pulse and interpulse intervals advantageously to provide for integrated operational self-checking features. The invention further concerns a counter circuit having a minimal number of relay switching devices for counting and checking during the pulse and interpulse intervals.

A substantial effort has been expended in the design of switching circuits to minimize the number of elements, such as relays, in counter circuits. This effort has resulted in a variety of minimal counter circuit designs. However, these various designs have generally been accomplished at the sacrifice of the simplicity in the operational control circuitry for the switching elements, such as relays.

Numerous circuit arrangements are also presently available for checking, or verifying, the operational accuracy of pulse counting circuits. These arrangements are customarily employed to detect circuit conditions which impair the performance of a system utilizing the counter. Although such prior art arrangements are technically reliable, they are generally costly and complex adjuncts to the counter facilities. These disadvantages occur because no checking facilities have heretofore been available as inherent structural elements of the counter circuit. In the past, such checking facilities have been provided as separate units operating under control of complicated apparatus configurations in a counter.

In view of the foregoing, it is an object of this invention to provide a counter circuit having a minimal number of switching elements together with simple and inexpensive operational control circuitry therefor.

Another object is to provide integrated self-checking features in a counter circuit.

It is another object to provide a simple procedure for determining the operational accuracy of a counter circuit.

The foregoing and other objects are achieved in accordance with an exemplary embodiment of this invention in which a minimal relay counter circuit is provided with simple and economical operate and hold paths for controlling the relays in ordered operational sequences during pulse and interpulse intervals to obtain integrated self-checking. Specifically, a fixed number of counter relays is operated in response to each pulse and a different fixed number is operated during interpulse intervals.

Accordingly, the number of such counter relays operated during interpulse and pulse intervals provides for easy self-checking of the operational accuracy of the counter visually or by contact arrays of the relays.

The exemplary embodiment presents five relays forming a decimal counting circuit. Each of the relays is connected individually via a simply configured operating path to a common pulsing relay circuit. Additionally, each relay is connected to a simply configured holding path. The choice and position of relay contacts in these paths determine a novel operating sequence of the counter in response to the pulsing relay which in turn is controlled by the received pulses.

Initially, two relays are operated prior to receipt of the first pulse and these relays control the operating paths of the remaining nonoperated relays so that the first pulse received at the input to the counter operates one of the latter relays. The operation of this relay causes the holding path of one of the relays formerly operated to be transferred to the pulsing contact. Subsequently, upon removal of the pulse, the transferred relay releases and the other two operated relays are maintained operated to control the operating paths of the nonoperated relays during the next pulse. Thereafter, this operating sequence is similarly repeated for each subsequently received pulse.

Therefore, during a counting sequence three relays are operated in response to a received pulse and subsequently two of those three relays remain operated during the interpulse interval. Manifestly, an observation of the number of relays operated enables personnel facilely to determine the operational accuracy of the counter. In addition, the number of relays operated during pulse and interpulse intervals provides for inherent self-checking operation of the counter by simple and economical contact arrangements of the counter relays. Such contact arrays also indicate the presence or absence of a pulse and the exact number of counted pulses.

A feature of this invention is the provision of a counting arrangement having a plurality of switching elements for counting electrical pulses and apparatus controlled by the switching elements for operating a first fixed number of the elements during the receipt of each pulse and a second different fixed number of the elements during the succeeding interpulse interval.

Another feature is the provision in the foregoing counting arrangement of facilities for operational self-checking during pulse and interpulse intervals.

Another feature is the provision of a five relay decimal counter having an arrangement of relay contacts in the operate and hold paths of the individual counting relays so that during a counting sequence a discrete combination of three relays out of the five is operated in response to each received pulse and two of these relays subsequently remain operated during the succeeding interpulse interval.

The foregoing and other objects, features and advantages of our invention will be more clearly understood by reading the following description of a specific illustrative embodiment thereof as shown in the drawing in which.

The schematic diagram employs a type of notation referred to as "detached contact" in which an "X" represents a normally opened contact of a relay and a vertical bar represents a normally closed contact of a relay, "normally" referring to the unoperated condition of a relay. The principles of this type of notation are described in an article entitled "An Improved Detached Contact Type of Circuit Drawing" by F. T. Meyer in the September 1955 publication of the American Institute of Electrical Engineers Transactions, Communications and Electronics, volume 74, pages 505–513.

Figure 1:
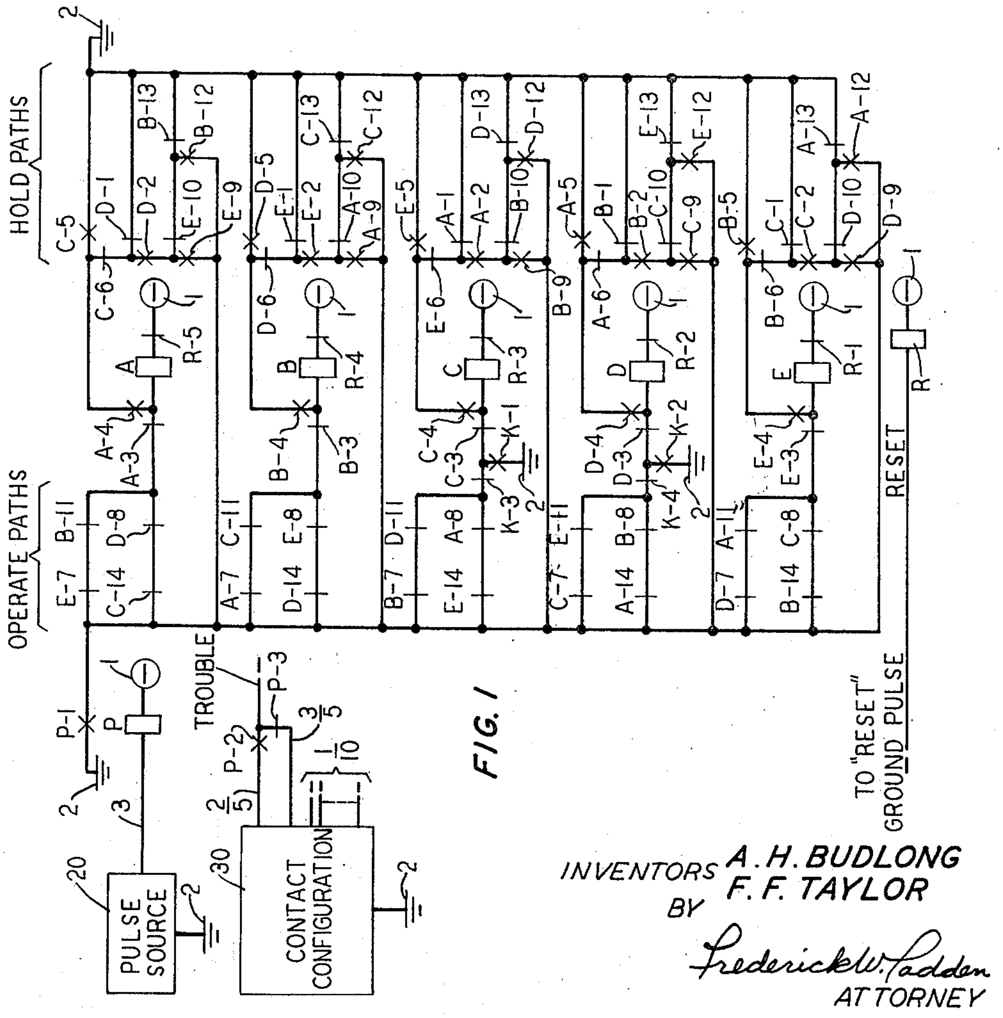
FIG. 1 is a schematic drawing of a five relay, ten pulse recycling counter.

FIG. 1 depicts a counter circuit having a vertical row of relays designated A–E for counting pulses generated by a pulsing relay P. In addition, the counter circuit includes a resetting relay R for releasing and restoring relays A–E to the nonoperated position. Each of the relays A–E is operable under control of a P relay make contact P–1, break contacts of relays A–E and R. For each pulsing operation and release of relay P, three and two relays, respectively, are operated in accordance with the following table.

OPERATING SEQUENCE OF COUNTER RELAYS

| | Pulse | | | | | | | | | | |
|---|---|---|---|---|---|---|---|---|---|---|---|
| | * | 1 | 2 | 3 | 4 | 5 | 6 | 7 | 8 | 9 | 10 |
| P Relay: | | | | | | | | | | | |
| Oper | | A, C, D | A, D, E | B, D, E | A, B, E | A, C, E | A, B, C | A, B, D | B, C, D | B, C, E | C, D, E. |
| RLS | C, D | A, D | D, E | B, E | A, E | A, C | A, B | B, D | B, C | C, E | C, D. |

* Period prior to first pulse.

Figure 2:
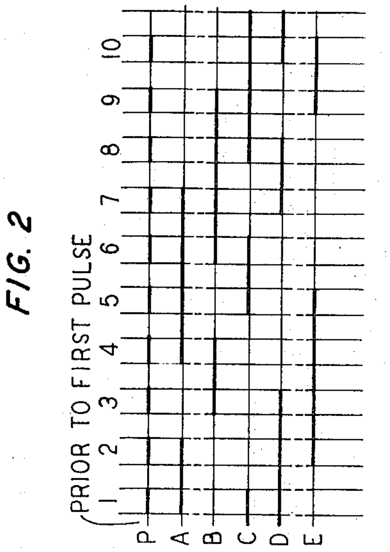
FIG. 2 is a diagram illustrating the sequence in which the five relays are operated for pulse counting.

Prior to the receipt of pulse 1, relays C and D are operated by the activation of key K of FIG. 1. Accordingly, the preceding table and the diagram in FIG. 2 show relays C and D operated prior to the first pulse. The function of relay R will be appropriately discussed in detail herein following the detailed description of the counting circuit operation.

The hold paths and operate paths indicated in FIG. 1 for relays A–E are reiterative and positional. The term "reiterative" refers to the contact array and specifically to the fact that each relay hold and operate path precisely suggests the hold and operate path for every other relay. The term "positional" further defines reiterative and refers to contact networks wherein the conditions for operating a relay may be expressed in terms of the relative physical position of the relays in the circuit.

For example, the operate path of relays A–E consists of two paths in parallel, each path having two break contacts in series. One path can be described as consisting of a break contact of the "second relay back" connected to a break contact of the "second relay forward." The parallel path can be similarly described as consisting of a break contact of the "first relay back" connected in series with a break contact of the "first relay forward." Applying this description to a specific one of the relays, for example relay C, it is manifest that the "second" and "first relays back" refer to relays A and B respectively and the "first" and "second relays forward" refer to relays D and E respectively. Advantageously, this positional reiterative characteristic pertains to the holding paths as well as the above illustrated operate paths.

The circuit of FIG. 1 is prepared for counting pulses by initially operating two of the relays A–E. According to the illustrative embodiment, the relays C and D are initially operated by the momentary activation of a key K after the negative potential 1 and ground 2 are applied to the circuit. The activation of key K completes the operate path for relay C which is from potential 1, contact R–3, the C relay winding and contact C–3 to ground 2 via the K key make contact K–1. In operating, relay C locks via contacts C–4, E–6 and A–1 to ground 2. Relay D is similarly operated under control of key K over the path from potential 1, contact R–2, the D relay winding and contact D–3 to ground 2 via the K key contact K–2. The operation of relay D closes its locking path via contacts D–4, A–6 and B–1 to ground 2. When key K is activated, its contacts K–3 and K–4 are opened to block the operation of the relays A, B and E.

Relay P of FIG. 1 detects pulses to be counted and repeats these pulses for counting by the relays A–E. Each pulse is applied to relay P in the form of a momentary closure of the ground 2 on lead 3 and it completes the operate circuit through the P relay winding to potential 1. As shown in FIG. 1, a pulse source 20 momentarily grounds lead 3 for each pulse. For each such pulse, relay P closes its contact P–1 to repeat a pulse for counting by the relays A–E.

After relays C and D are operated as described earlier and key K is released, the first ground pulse operates relay P which in turn closes contact P–1 to operate relay A over the path from potential 1, contact R–5, the A relay winding and contacts A–3, B–11 and E–7. In operating, relay A locks via contacts A–4 and C–5 to ground 2. The operation of relay A completes a holding path for relay D via contacts D–4 and A–5 to ground 2. Relay A also provides a holding path for relay C via contacts C–4, E–6, A–2, B–10, D–12 and P–1 to ground 2. At the end of the first pulse, contact P–1 opens the holding path for relay C to release it. Also at the end of the first pulse, the hold path of relay A is transferred via A–4, C–6, D–2, E–10 and B–13 to ground 2. Therefore, during the succeeding interpulse interval relays D and A remain operated.

Upon receipt of a second pulse, relay E is operated over the path from potential 1, contact R–1, the E relay winding and contacts E–3, C–8 and B–14 to ground 2 via contact P–1. In operating, relay E locks via contacts E–4, B–6 and C–1 to ground 2. The operation of relay E provides a holding path for relay A via contacts A–4, C–6, D–2, E–9 and P–1 to ground 2. At the end of the second pulse, contact P–1 opens the last described holding path to release relay A. During the interpulse interval, the hold path of D relay is transferred via D–4, A–6, and B–1 to ground 2 and relays D and E are held operated.

A third pulse causes the operation of relay B over the path from potential 1, contact R–4, the B relay winding and contacts B–3, C–11, A–7 and P–1 to ground 2. Upon operating, relay B locks via contacts B–4 and D–5 to ground 2. Operated relay B also provides a holding path for relay E via contacts E–4 and B–5 to ground 2. Relay B furnishes a holding path for relay D via contacts D–4, A–6, B–2, C–10, E–12 and P–1 to ground 2. Relay D is released at the end of the third pulse when contact P–1 opens the last described holding path. Consequently, relays B and E remain operated during the interpulse interval: In releasing, relay D provldes a holding path for relay B via contacts B–4, D–6, E–2, A–10 and C–13 to ground 2.

The fourth pulse effects the operation of relay A over the path from potential 1, contact R–5, the A relay winding and contacts A–3, D–8, C–14 and P–1 to ground 2. Relay A then locks via contacts A–4, C–6 and D–1 to ground 2. The operation of relay A provides a holding path for relay B via contacts B–4, D–6, E–2, A–9 and P–1 to ground 2. Relay B next is released by the opening of the latter holding path at contact P–1 at the end of the fourth pulse. The release of relay B provides a holding path for relay E via contacts E–4, B–6 and C–1 to ground 2.

Relay C is operated under control of a fifth pulse after contact P–1 completes a path from ground 2 through contacts B–7, D–11, K–3 and C–3 and the C relay winding to potential 1 through contact R–3. In operating, relay C locks via contacts C–4 and E–5 to ground 2. Relay C also completes a holding path for relay A via contatcs A–4 and C–5 to ground 2 and for relay E via contacts E–4, B–6, C–2, D–10, A–12 and P–1 to ground 2. The latter holding path is opened under control of contact P–1 at the end of the fifth pulse and causes the release of relay E. In releasing, relay E provides a holding path for relay C via contacts C–4, E–6, A–2, B–10 and D–13 to ground 2.

A sixth pulse results in the operation of relay B over the path including contacts R–4, B–3, E–8, D–14 and P–1 to ground 2. In operating, relay B locks via contacts B–4, D–6 and E–1 to ground 2. Relay B also completes a holding path for relay C via contacts C–4, E–6, A–2, B–9 and P–1 to ground 2. At the end of the sixth pulse, contact P–1 opens the latter holding path for releasing relay C. In releasing, relay C provides a holding path for relay A via contacts A–4, C–6 and D–1 to ground 2.

When contact P–1 closes upon the receipt of the seventh pulse, relay D operates via contacts R–2, D–3, K–4, E–11, C–7 and P–1 to ground 2. The operation of relay D provides a holding path for relay B via contacts B–4 and D–5 to ground 2. Relay D also provides a holding path for relay A via contacts A–4, C–6, D–2, E–10, B–12 and P–1 to ground 2. The latter holding path is opened at contact P–1 at the end of the seventh pulse for releasing relay A. In releasing, relay A provides a holding path for relay D via contacts D–4, A–6, B–2, C–10 and E–13 to ground 2.

The eighth pulse causes the operation of relay C over the path including contacts R–3, C–3, K–3, A–8, E–14 and P–1 to ground 2. In operating, relay C locks via contacts C–4, E–6 and A–1 to ground 2. Relay C furnishes a holding path for relay D via contacts D–4, A–6, B–2, C–9 and P–1 to ground 2. Contact P–1 opens the latter holding path at the end of the eighth pulse for releasing relay D. The release of relay D provides a holding path for relay B via contacts B–4, D–6 and E–1 to ground 2.

Upon receipt of a ninth pulse, relay E is operated via contacts R–1, E–3, A–11, D–7 and P–1 to ground 2. Relay E then locks via contacts E–4 and B–5 to ground 2. Relay E provides a holding path for relay B via contacts B–4, D–6, E–2, A–10, C–12 and P–1 to ground 2. At the end of the ninth pulse contact P–1 opens the latter holding circuit to release relay B. In releasing, relay B furnishes a holding circuit for relay E via contacts E–4, B–6, C–2, D–10 and A–13 to ground 2.

The tenth pulse operates relay D over a path including contacts R–2, D–3, K–4, B–8, A–14 and P–1 to ground 2. Operated relay D provides a holding path for relay E via contacts E–4, B–6, C–2, D–9 and P–1 to ground 2. This latter path is opened at the end of the tenth pulse by contact P–1 to release relay E thereby providing a holding path for relay C over contacts C–4, E–6 and A–1 to ground 2.

The release of relay E at the end of the tenth pulse indicates the completion of the operational cycle of the counter. The counter response to the eleventh pulse is identical to the counter response described earlier upon the receipt of the first pulse. The counter operation thereafter in response to received pulses twelve through twenty is identical to the operation of the counter described for pulses two through ten respectively. This cyclic counter operation is repeated for every series of ten pulses thereafter.

Relay R provides a "reset" function for applications of the illustrated counter wherein the counter is required to consecutively count the number of pulses in each group of a series of such groups starting from a fixed reference position. For simplicity and ease in understanding this application, the reference position is arbitrarily selected as relays C and D operated; this corresponds as shown in FIG. 2 to the start position prior to the first pulse.

After the last pulse is received in a particular counting sequence and the last-operated counter relay combination is recorded, the procedure for restoring the counter to the reference position begins with a ground pulse on lead reset thereby completing a path to operate relay R which includes the winding of relay R to potential 1. Thereafter, break contacts R–1 to R–5 disconnect potential 1 from relays A–3 respectively, for releasing the priorly operated A–E relays. In response to the removal of ground from the reset lead, relay R releases restoring the connection between potential 1 and the windings of relays A–E. Immediately following this release, key K is operated resulting in the operation of relays C and D as discussed elsewhere thereby completing the procedure for restoring the counter to the reference position.

Referring to FIG. 1, the counter circuit includes a contact configuration 30 which comprises a coded contact array of the relays A–E for supplying to the associated set of leads designated 1/10 ground signals indicative of the counted number of pulses. The contact configuration 30 also comprises 2/5 and 3/5 contact arrays of the relays A–E for supplying to the respective leads designated 2/5 and 3/5 ground signals indicative of the number of the relays A–E operated during pulse and interpulse intervals.

It will be recalled that during the counting operation three relays were operated when contact P–1 closed and two relays were operated when contact P–1 was open. Under the latter operation ground 2 is connected by contact configuration 30 to lead 2/5 and, under the former, ground 2 is connected to lead 3/5. The presence of ground 2 on these leads is compared logically with the operated or nonoperated condition of the P relay, as shown in FIG. 1 wherein lead 2/5 is connected to contact P–2 and lead 3/5 is connected to contact P–3. In this manner, a counter failure is indicated by the presence of ground 2 on the lead designated "trouble."

It is to be understood that the hereinbefore described equipment arrangements are illustrative of the application of the principles of the invention. In light of this teaching, it is apparent that numerous other arrangements may be devised by those skilled in the art without departing from the spirit and scope of the invention.

We claim:

1. A counter for counting electrical pulses comprising
a plurality of pulse-responsive switching elements and
means connecting said elements to said pulses for activating a first fixed plurality of said elements in response to each of said pulses and a second fixed plurality of said elements not equal in number to said first plurality during succeeding interpulse intervals.

2. The invention claimed in claim 1 wherein said connecting means includes
a pulse receiving circuit,
and switch means individual to each one of said switching elements for cooperating with said circuit for activating a first fixed plurality of three of said elements in response to each of said pulses and a second fixed plurality of two of said elements during succeeding interpulse intervals, and said individual switch means for each one of said elements being controllable by others of said elements for selectively connecting received pulses to said last-mentioned one of said elements.

3. The invention claimed in claim 2 wherein said counter further comprises hold operated path means individual to each one of said switching elements, and being controllable by said elements during said interpulse interval to release one of said three elements during succeeding interpulse intervals thereby to hold operated two of said last-mentioned three elements.

4. The invention claimed in claim 2 wherein said counter comprises a five element decimal counter and wherein each of said switch means includes apparatus for connecting said elements to said pulse receiving circuit for operating three distinct ones of said elements in response to each one of ten consecutive ones of said pulses.

5. A counter for counting electrical pulses comprising
a source of pulses,
a plurality of counting relays arranged in a row, and means connecting contacts of said counting relays to said source of pulses and to said relays for operating three distinct ones of said relays during each of said pulses and for subsequently holding operated two of said three relays during a suceeding interpulse interval, said means including a first and a second parallel path for connecting each relay to said pulse source, said first path including in series break contacts of the two immediately adjacent relays in said row to said each relay and said second path including in series break contacts of the next two immediately adjacent relays in said row to said each relay.

6. A counter in accordance with claim 5 wherein said connecting means further includes a circuit from said source to each relay and including, in parallel portions thereof, a make contact of the immediately preceding relay in said row and a make contact of the immediately succeeding relay in said row.

7. A counter for counting electrical pulses comprising a source of pulses, a source of potential of the same polarity as said pulses, a plurality of counting relays arranged in a row, operate path means for operating three distinct ones of said relays during each of said pulses, said operate path means including a first and a second parallel path for connecting each relay to said pulse source, said first parallel path including in series break contacts of the two immediately adjacent relays in said row to said each relay and said second parallel path including in series break contacts of the next two immediately adjacent relays in said row to said each relay, and hold path means for subsequently holding operated two of said three operated relays during a succeeding interpulse interval, said hold path means including a first preferred circuit including a make contact of the second succeeding relay in the row for connecting said each relay to said source of potential, a second preferred circuit including a break contact of the second preceding relay in the row for connecting said each relay to said potential source, a third preferred circuit including in series break contacts of the immediately preceding and immediately succeeding relays in the row for connecting said each relay to said potential source, and a further circuit for connecting said pulse source to said each relay and including in parallel portions thereof make contacts of said immediately preceding and immediately succeeding relays in the row.

8. A self-checking pulse counter comprising an input means for receiving pulses, a plurality of switching elements, a first means for connecting said switching elements to said input means for operating a first fixed number of said elements in response to each of said received pulses, a second means for controlling the operation of a different fixed number of said elements during each succeeding interpulse interval, and self-checking means cooperating with said input means for checking the number of said operative elements and signifying the operational accuracy of said counter during pulse and interpulse intervals.

9. The invention claimed in claim 8 wherein said first and second means comprise means for operating at least three of said switching elements in response to each of said received pulses and for holding operated two of said operated elements during each succeeding interpulse interval, and wherein said self-checking means includes apparatus controllable by said input means and said elements for determining the operational accuracy of said counter by checking that three and two of said elements are operated during each respective pulse and interpulse intervals.

10. The invention claimed in claim 9 wherein said elements comprise relays each having a plurality of contacts which form checking contact network means including at least one two-out-of-five and one three-out-of-five contact arrays and each one of said contact arrays being individually connected in series with said pulse-response circuit for checking the operational accuracy of said counter during each interpulse interval by means including said three-out-of-five contact array and during each pulse interval by means including said two-out-of-five contact array.

11. A counter circuit comprising a plurality of relays each having a plurality of break and make contacts, said relays including a first relay back, a second relay back, a first relay forward, and a second relay forward, a first potential, a pulse-receiving circuit, reiterative positional networks for connecting each of said relays to said first potential and to said pulse-receiving circuit for holding said relays operative, each said network comprising in series relation a first make contact of said relay to be held operated connected to break and make contacts of said second relay forward, said latter make contact being operable to connect said first potential to said first make contact and said break contact being arranged to connect break and make contacts of said second relay back to said first make contact, said last-mentioned break contact being arranged to connect said first potential to said break contact of said second relay forward and said associated last-mentioned make contact being operable to connect break and make contacts of said first relay back to said break contact of second relay forward, said last-stated make contact being operable to connect said pulse-receiving circuit to said make contact of said second relay back and said associated break contact being arranged to connect break and make contacts of said first relay forward to said make contact of said second relay back, and said make contact of said first relay forward being arranged to connect said pulse-receiving circuit to said break contact of said first relay back.

12. The invention claimed in claim 10 wherein said network operatively connects each said relay to said pulse-receiving circuit by a contact network comprising first and second parallel paths interconnecting each relay with said pulse-receiving circuit, said first path including serially connected break contacts on said first relay back and first relay forward, and said second path including serially connected break contacts on said second relay forward and said second relay back.

References Cited

UNITED STATES PATENTS

| | | | |
|---|---|---|---|
| 2,552,629 | 5/1951 | Hamming et al. | |
| 2,680,781 | 6/1954 | Avery | |
| 2,773,648 | 12/1956 | Cannon | 317—140 XR |
| 2,775,726 | 12/1956 | Kroes et al. | 317—140 |
| 3,076,918 | 2/1963 | Hinkle et al. | 317—140 |
| 3,387,186 | 6/1968 | Boswau | 340—168 XR |

FOREIGN PATENTS

| | | |
|---|---|---|
| 746,131 | 3/1956 | Great Britain. |

J. D. TRAMMELL, Primary Examiner

W. M. SHOOP, Jr., Assistant Examiner

U.S. Cl. X.R.

340—168